United States Patent Office 2,996,513
Patented Aug. 15, 1961

2,996,513
PRODUCTION OF N-CARBOXY-ALPHA-AMINO ACID ANHYDRIDES
Denis George Harold Ballard, Holyport, near Maidenhead, England, assignor to Courtaulds Limited, London, England, a British company
No Drawing. Filed Apr. 9, 1959, Ser. No. 805,137
Claims priority, application Great Britain July 8, 1958
8 Claims. (Cl. 260—307)

This invention relates to the production of N-carboxy-α-amino acid anhydrides.

It is known that phosgene reacts with α-amino acids to produce corresponding N-carboxy anhydrides. Thus, Fuchs in Berichte, volume 55 (1922), page 2943, reported the preparation of N-phenylglycine N-carboxy anhydride from N-phenylglycine and phosgene using water as solvent. The general reaction proceeds as follows:

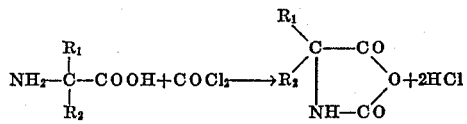

In these formulae $R_1$ and $R_2$ represent hydrogen or monovalent hydrocarbon radicals which may also be substituted, or together they may form a ring.

In carrying out this process it is possible to modify the conditions, as is described in British patent specification No. 646,033 of Imperial Chemical Industries Limited, whereby, in addition to N-carboxy anhydrides, acid chloride derivatives, namely:

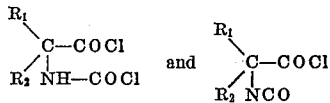

are obtained.

I have described an improved process for the manufacture of N-carboxy-α-amino acid anhydrides in my application Serial No. 805,138, filed herewith according to which phosgene is reacted with an α-amino acid and the average particle size of the α-amino acid used is not greater than 5 microns (1 micron being $10^{-6}$ metres) and is preferably not greater than 1 micron; the mixing of the phosgene and the finely-divided α-amino acid is also preferably so controlled that there is substantially no excess of either reagent in the reaction mixture at any time during the reaction, the total amount of phosgene used being substantially equivalent to the α-amino acid as required by the general reaction given in the equation set out above.

When phosgene is reacted with an α-amino acid I have found that, even when conditions favouring the production of anhydrides are used, as described in the said specification No. 646,033 or in my co-pending application No. 805,138, acid-chloride derivatives are generally formed to some extent during the reaction; thus, even with the highly favourable conditions specified in my application Serial No. 805,138, small quantities of acid chloride derivatives are obtained. When the anhydride is to be used in the manufacture of polymers, usually known as polypeptides, the presence of such acid-chloride derivatives, even in small quantities, is a disadvantage.

The object of this invention is to remove all or a large proportion of such acid-chloride derivatives in a simple manner.

In accordance with this invention, a method of removing acid-chloride derivatives from an N-carboxy-α-amino acid anhydride containing such derivatives comprises dissolving the impure anhydride in an organic solvent for the anhydride containing a small proportion of a mono- or di-substituted formamide or a mono- or di-substituted acetamide and crystallising the anhydride from the solution.

The substituted formamides and acetamides which are used in accordance with this invention have at least one substituted group attached to the N atom of the amide group and they have the general formula:

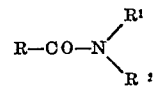

in which R is hydrogen or a methyl group, R' is hydrogen or a hydrocarbon group and $R^2$ is a hydrocarbon group. The preferred compound for use in this invention is N.N-dimethyl formamide in which R is hydrogen and $R^1$ and $R^2$ are both methyl groups. Examples of other compounds which may be used are N.N-allyl benzyl formamide, N.N-diethyl formamide and dimethyl acetamide. Mono-substituted compounds may also be used for example N-methyl formamide, N-methyl acetamide and N-ethyl acetamide but in general the disubstituted compounds are more efficient than the mono-substituted compounds.

I have found that the substituted formamides and acetamides, and particularly N.N-dimethyl formamide, increases the solubility of the acid-chlorides in the main solvent and so facilitate the removal of such compounds by keeping them in solution during the crystallisation of the anhydride. By means of one crystallisation according to this invention, anhydrides may be obtained containing no more than 0.1 gram mol percent of chlorine and generally less than this amount for example from 0 to 0.03 gram mol percent of chlorine. These anhydrides can be used directly for the manufacture of polypeptides.

The actual organic solvent used for recrystallising the amino acid anhydride will depend on the solubility characteristics of the particular anhydride being prepared and must, of course, be a solvent from which the anhydride can be recrystallised. In view of the fact that the anhydrides undergo polymerization in the presence of compounds containing labile hydrogen atoms, such compounds should be excluded as they act as polymerization initiators. In general, one of the solvents, chloroform, methylene chloride, benzene or ethyl acetate will be found to be suitable. Other solvents may, however, be used, for example trichlorethylene, carbon tetrachloride, toluene, a xylene or mixture of xylenes, methyl acetate and methyl propionate. Tetrahydrofurance and dioxane may also be used.

The substituted formamides and acetamides specified for this invention are used in small proportions for example from 5 to 20 percent by volume based on the volume of the main solvent. High concentrations of the substituted formamides and acetamides are not desirable as they lead to difficulties in crystallising the anhydride in satisfactory yields.

The present invention may be used to remove acid chloride compounds from the reaction product of phosgene with any α-amino acid, examples of which are glycine, alanine, leucine, phenylalanine, valine, norvaline, proline, norleucine, isoleucine, gamma-methyl-L-glutamate, gamma-benzyl-L-glutamate and α-aminoisobutyric acid; the optically active or racemic forms of the acid may be used.

The invention is illustrated by the following examples. In all the examples the chlorine contents referred to were determined by potentiometric titration of the solution obtained by dissolving the anhydride in dilute nitric acid and neutralising to methyl orange with sodium hydroxide. The amount of chlorine is expressed as gram mol percent based on the N-carboxy anhydride. This amount of chlorine is calculated from the expression $$\frac{Mx}{100W}$$

where $x$ is the number of cc. of 0.1 N silver nitrate solution required for neutralization, W is the weight of the N-carboxy anhydride and M is the molecular weight.

Example 1

97 grams of gamma-methyl-L-glutamate were reacted with 61 grams of phosgene as described in Example 1 of the specification of my application Serial No. 805,138, to produce 110 grams of crude gamma-methyl-L-glutamate N-carboxy anhydride containing 0.5 percent of chlorine.

The 110 grams of crude anhydride were dissolved in a solvent mixture of 116 grams of chloroform and 9.3 grams of N.N-dimethyl formamide (10 percent by volume) and on crystallisation, 84 grams of practically pure anhydride (containing less than 0.01 percent of chlorine) were obtained.

Example 2

38 grams of gamma-methyl-L-glutamate were reacted with 24 grams of phosgene as described in Example 2 of the specification of my application Serial No. 805,138 to produce 43 grams of crude gamma-methyl-L-glutamate N-carboxy anhydride containing 0.7 percent of chlorine.

The 43 grams of crude anhydride were dissolved in a solvent mixture of 44.5 parts of chloroform and 3.6 grams of N.N-dimethyl formamide and on crystallisation 32 grams of gamma-methyl-L-glutamate N-carboxy anhydride containing 0.03 percent of chlorine were obtained.

Example 3

150 grams of D-alanine were reacted with 171 grams of phosgene as described in Example 4 of the specification of my application Serial No. 805,138 to produce 192 grams of crude D-alanine N-carboxy anhydride containing 0.7 percent of chlorine.

The 192 grams of crude anhydride were dissolved in 153 cc. of chloroform containing 10 percent by volume of N.N-dimethyl formamide and on crystallisation 163 grams of pure D-alanine N-carboxy anhydride were obtained, the product containing no detectable chlorine.

Example 4

28 grams of gamma-benzyl-L-glutamate were reacted with 12 grams of phosgene as described in Example 5 of the specification of my application Serial No. 805,138 to produce 31 grams of crude gamma-benzyl-L-glutamate containing 0.4 percent of chlorine.

The 31 grams of crude anhydride were dissolved in 60 mls. of ethyl acetate containing 10 percent by volume of N.N-dimethyl formamide and on crystallisation 24 grams of pure gamma-benzyl-L-glutamate were obtained, the product containing no detectable chlorine.

Example 5

18 grams of gamma-methyl-L-glutamate were milled to an average particle size of 5 microns in a colloid mill using 130 grams of dioxane as dispersing medium. The resulting dispersion was added slowly to 280 grams of dioxane maintained at 50° C. and at the same time 11.2 grams of phosgene dissolved in 60 grams of dioxane were added at such a rate that equivalent quantities of phosgene and gamma-methyl-L-glutamate were entering the reactor at any moment. The reaction took 30 minutes and the dioxane was removed by vacuum distillation and petrol was added to crystallise the oil. 20 grams of crude gamma-methyl-L-glutamate N-carboxy anhydride containing 1.9 percent of chlorine were obtained.

The 20 grams of crude anhydride were dissolved in 40 cc. of chloroform containing 10 percent by volume of N.N-dimethyl acetamide and on crystallisation the solution yielded 15.4 grams of gamma-methyl-L-glutamate N-carboxy anhydride containing 0.32 percent of chlorine, that is 17 percent of that originally present.

Example 6

20 grams of crude gamma-methyl-L-glutamate N-carboxy anhydride containing 6.4 percent of chlorine were dissolved in 80 mls. of chloroform containing 10 percent by volume of N.N-allyl benzyl formamide and the solution, on crystallisation, yielded 14 grams of gamma-methyl-L-glutamate N-carboxy anhydride containing 0.13 percent of chlorine, that is 2 percent of that originally present.

What I claim is:

1. A method of removing acid-chloride derivatives from an N-carboxy-alpha-amino acid anhydride mixed with such derivatives which comprises dissolving the impure anhydride in an organic solvent for the anhydride selected from the group consisting of chloroform, methylene chloride, benzene, ethyl acetate, trichloroethylene, carbon tetrachloride, toluene, xylenes, methyl acetate, methyl propionate, tetrahydrofurane and dioxane, said solvent containing a small proportion of a compound selected from the group consisting of N,N-dimethyl formamide, N,N-allyl benzyl formamide, N,N-diethyl formamide, dimethyl acetamide, N-methyl formamide, N-methyl acetamide, and N-ethyl acetamide, and crystallising the anhydride from the solution.

2. The method claimed in claim 1 wherein the solvent is ethyl acetate.

3. The method claimed in claim 2 wherein the solvent is ethyl acetate.

4. A method of removing acid-chloride derivatives from an N-carboxy-alpha-amino acid anhydride mixed with such derivatives which comprises dissolving the impure anhydride in an organic solvent for the anhydride selected from the group consisting of chloroform, methylene chloride, benzene, ethyl acetate, trichloroethylene, carbon tetrachloride, toluene, xylenes, methyl acetate, methyl propionate, tetrahydrofurane and dioxane, said solvent containing a small proportion of dimethyl formamide, and crystallising the anhydride from the solution.

5. A method of removing acid-chloride derivatives from an N-carboxy-alpha-amino acid anhydride mixed with such derivatives which comprises dissolving the impure anhydride in an organic solvent for the anhydride chosen from the group consisting of chloroform, methylene chloride, benzene, ethyl acetate trichloroethylene, carbon tetrachloride, toluenes, xylenes, methyl acetate, methyl propionate, tetrahydrofurane and dioxane, said solvent containing 5 to 20 percent by volume of a compound selected from the group consisting of N,N-dimethyl formamide, N,N-allyl benzyl formamide, N,N-diethyl formamide, diethyl acetamide, N-methyl formamide, N-methyl acetamide, and N-ethyl acetamide, and crystallising the anhydride from the solution.

6. A method of removing acid-chloride derivatives from an N-carboxy-alpha-amino acid anhydride mixed with such derivatives which comprises dissolving the impure anhydride in an organic solvent for the anhydride chosen from the group consisting of chloroform, methylene chloride, benzene, ethyl acetate trichloroethylene, carbon tetrachloride, toluenes, xylenes, methyl acetate, methyl propionate, tetrahydrofurane, and dioxane, said solvent containing 5 to 20 percent of dimethyl formamide, and crystallising the anhydride from the solution.

7. A method of removing acid-chloride derivatives from an N-carboxy-alpha-amino acid anhydride mixed with such derivatives which comprises dissolving the impure anhydride in chloroform containing 5 to 20 percent by volume of a compound selected from the group consisting of N,N-dimethyl formamide, N,N-allyl benzyl formamide, N,N-diethyl formamide, dimethyl acetamide, N-methyl formamide, N-methyl acetamide, and N-ethyl acetamide, and crystallising the anhydride from the solution.

8. A method of removing acid-chloride derivatives from an N-carboxy-alpha-amino acid anhydride mixed with such derivatives which comprises dissolving the impure anhydride in chloroform containing 5 to 20 percent by volume of dimethyl formamide, and crystallising the anhydride from the solution.

References Cited in the file of this patent

UNITED STATES PATENTS 2,789,973    MacDonald _____ Apr. 23, 1957

FOREIGN PATENTS 646,033    Great Britain _____ Nov. 15, 1950

UNITED STATES PATENT OFFICE
CERTIFICATE OF CORRECTION

Patent No. 2,996,513            August 15, 1961

Denis George Harold Ballard

It is hereby certified that error appears in the above numbered patent requiring correction and that the said Letters Patent should read as corrected below.

Column 4, line 31, for "3. The method claimed in claim 2" read -- 4. The method claimed in claim 3 --; line 33, for "4. A method of" read -- 3. A method of --.

Signed and sealed this 27th day of February 1962.

(SEAL)
Attest:

ERNEST W. SWIDER
Attesting Officer

DAVID L. LADD
Commissioner of Patents